April 18, 1933.　　　B. G. JUTTING　　　1,903,818
WING LIFT SYSTEM FOR AIRCRAFT
Filed March 2, 1932　　　2 Sheets-Sheet 2
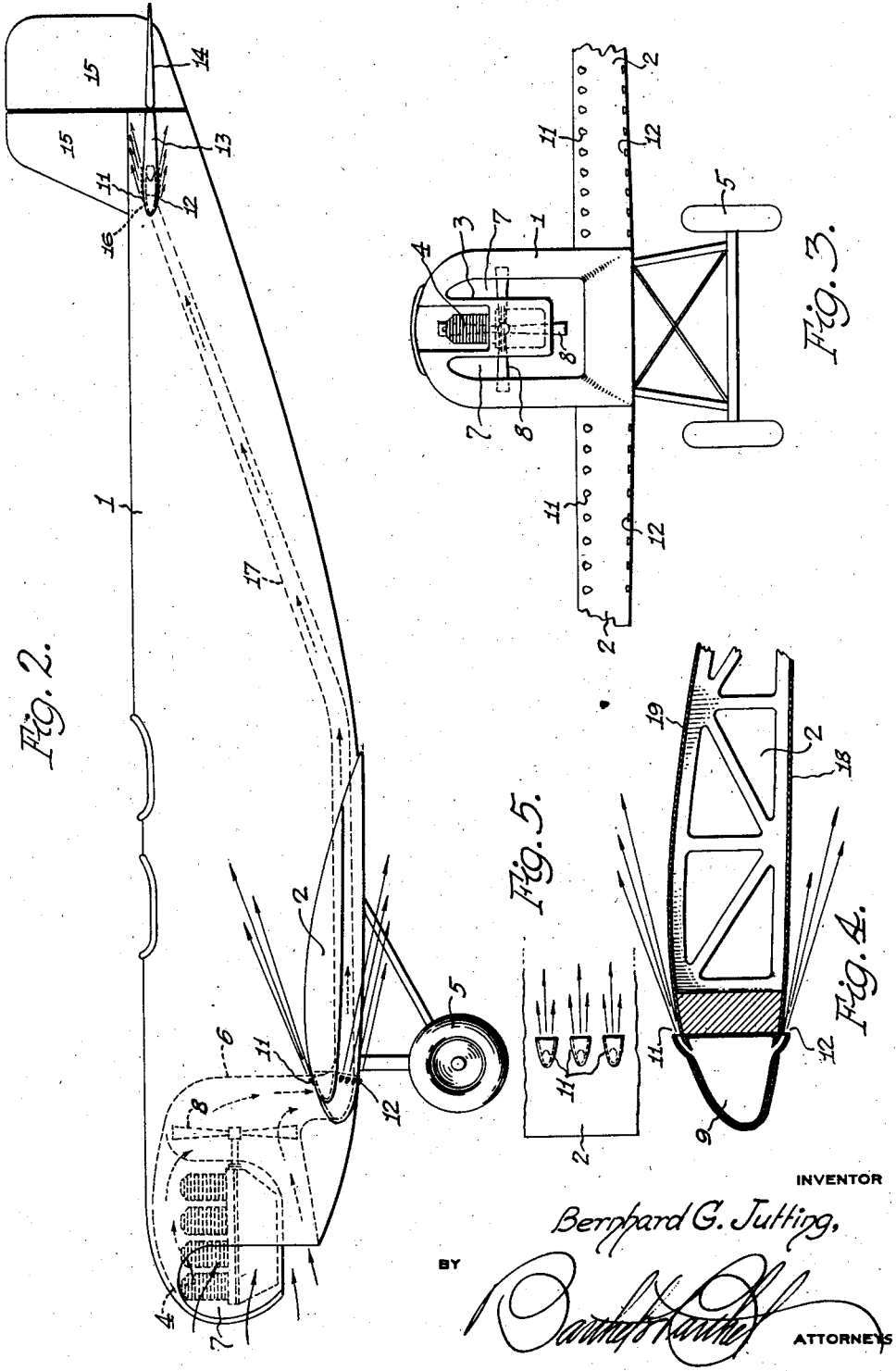
INVENTOR
Bernhard G. Jutting,
BY
ATTORNEYS Patented Apr. 18, 1933

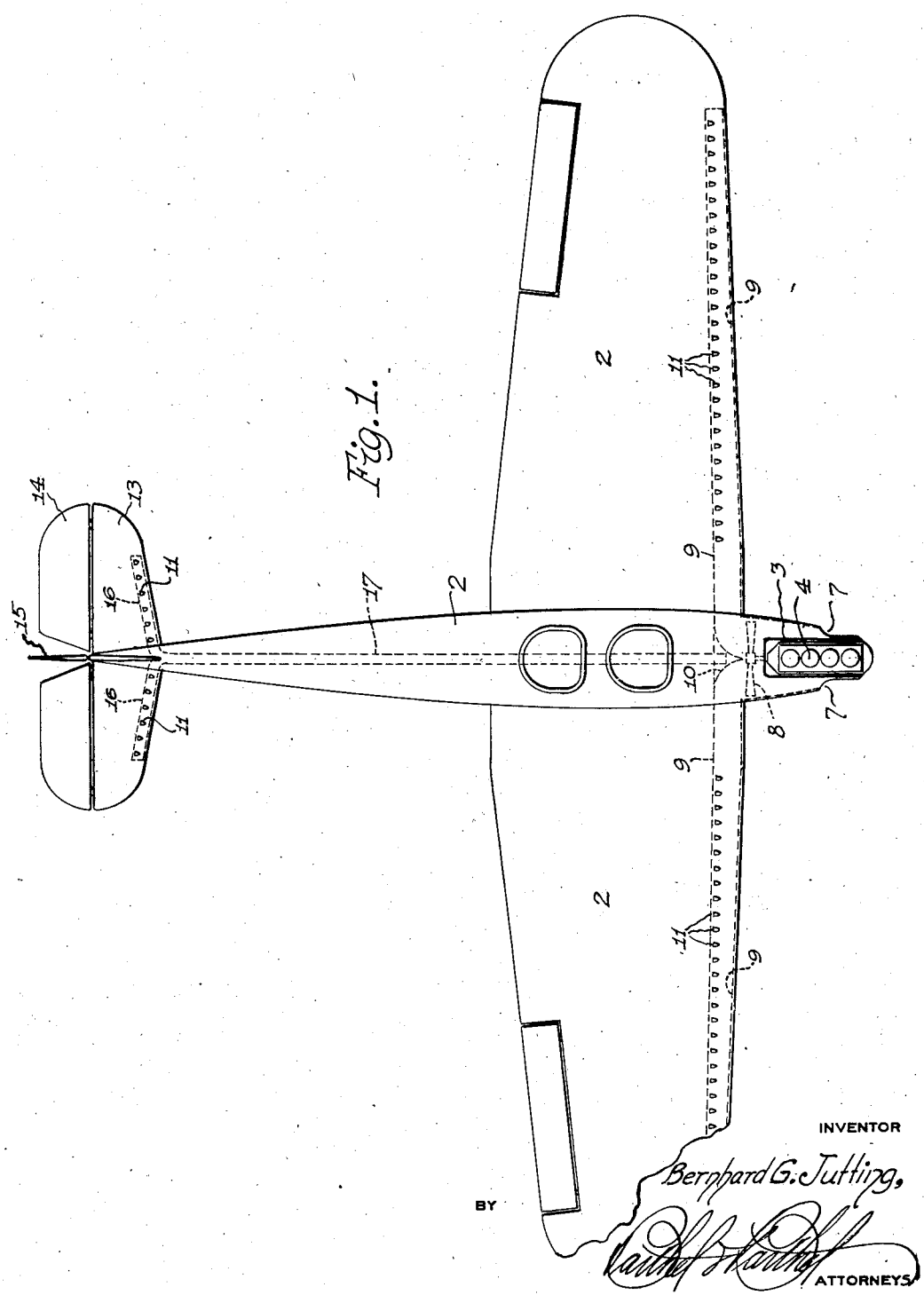

1,903,818

UNITED STATES PATENT OFFICE

BERNHARD G. JUTTING, OF JERSEY CITY, NEW JERSEY

WING LIFT SYSTEM FOR AIRCRAFT

Application filed March 2, 1932. Serial No. 596,272.

The present invention pertains to aircraft of the heavier-than-air type, and the principal object is to derive useful work from the slip stream of the propeller which is ordinarily wasted. Such use of the slip stream, according to the invention, enables the plane to take off and land at lower speeds and to cruise at greater speeds than otherwise possible with a given fuel consumption.

It is well known that the lift of an aerofoil depends on the velocity of air passing over and under the same. This principle is utilized in the present invention in that the slip stream is conducted to a passage formed in the forward edge of the aerofoil transversely of the direction of travel of the craft. Nozzles are formed to extend from this passage in a rearward direction at both the upper and lower surfaces, and air is ejected therefrom at an increased velocity. This action is equivalent to increasing the velocity of air passing over and above the aerofoil, and consequently the lifting power of the latter is increased. Moreover, the rearward direction of the air issuing from the nozzles has a forward reaction which aids in propelling the plane.

Because of this arrangement the propeller may be smaller than usual size and in fact functions primarily as a blower for driving air to the nozzles and as a propeller only in a secondary manner.

The invention is fully disclosed by way of example in the following description and in the accompanying drawings, in which—

Figure 1 is a plan view of an aeroplane constructed according to the invention;

Fig. 2 is a side elevation thereof;

Fig. 3 is a front elevation;

Fig. 4 is a detail longitudinal section of the aerofoil; and

Fig. 5 is a fragmentary plan view thereof.

Reference to these views will now be made by use of like characters which are employed to designate corresponding parts throughout.

In Figures 1 and 2 is illustrated the body or fuselage 1 of an aeroplane having a single transverse wing or aerofoil 2 at its lower surface and near the forward end. The forward end of the fuselage carries a metal frame 3 for supporting a suitable motor 4. The bottom of the plane also carries any usual or conventional landing gear as indicated by the numeral 5.

The frame 3 is formed with a pair of longitudinal air passages 6 as shown more clearly in Figures 1 and 2, and the forward end of the frame is formed with openings 7 leading to the passages. The passages 6 merge into one another behind the motor, and the rear end of the motor carries a blower or propeller 8 in the joined passage.

The leading edge of the wing 2 is formed with a lengthwise passage 9 to the center of which the joined passages 6 lead as may be seen more clearly in Figure 1. Where the passages 6 communicate with the passage 9, a double deflector 10 is provided for directing air to both sides of the passage 9 from the passages 6. Rearwardly directed nozzles 11 and 12 extend from the passage 9 at the upper and lower surfaces of the wing 2.

The craft carries the usual empennage comprising a transverse tail wing 13, elevators 14 hinged to the rear edge thereof, and a hinged rudder 15 extending vertically between the elevators. The forward edge of the tail wing 13 is preferably formed with a longitudinal passage 16 connected to the bottom of the joined passages 6 by means of a line 17 extending along the bottom of the fuselage.

The wing 2 has the usual aerofoil cross section comprising a flat base 18 and a convex upper surface 19. It is well known in aerodynamics that an aerofoil of this type is lifted by a strong current of air directed against its forward edge or that it will rise when propelled through the air at high velocity. Further, it is known that the lifting force depends on the velocity of the air relatively to the aerofoil.

In the operation of the device described herein, it will readily be seen that air is drawn into the passages 6 by means of the propeller 8 and delivered to the passages 9 from which it is discharged rearwardly through the nozzles 11 and 12. The restricted nature of the nozzles imparts a high velocity to the air issuing therefrom, and the small streams thus formed have the effect of a high velocity current of air blowing along both surfaces 18 and 19, with the resulting lifting action. Moreover, the rearwardly directed streams have a forward reaction on the aerofoil, so that the blower 8 is not relied upon entirely for forward propulsion as in the case of an ordinary propeller. In fact, the member 8 serves primarily as a blower for furnishing the air current to the nozzles and only secondarily as a propeller. Nevertheless, a conventional propeller may be carried at the forward end of the motor in addition to or in substitution of the blower 8. A similar action occurs at the tail wing 13 and therefore need not be described in detail. The air released over the tail surfaces also adds to the controllability of the craft, since this air is released at points on these surfaces where it gives them moment at lower air speeds than would otherwise be possible.

As a result of the invention, the plane is capable of developing a greater lift than usual with a given power consumption. Consequently, the take off is quicker and the landing speed lower. Also, because of the forward reaction at the nozzles 11 and 12 and because of the utilization of the slip stream which is otherwise wasted, the cruising speed and general efficiency of the machine are increased.

Although a specific embodiment of the invention has been illustrated and described, it will be understood that various alterations in the details of construction may be made without departing from the scope of the invention, as indicated by the appended claims.

What I claim is:—

1. In an aeroplane, a fuselage, a motor frame at the forward end thereof, a blower carried by said motor, a wing mounted transversely of said fuselage and having a flat bottom surface and a convex upper surface, an air passage formed along the forward edge of said wing transversely of the direction of travel and nozzles extending rearwardly from said passage at both surfaces, and air intake passages formed in said frame and connected to the first named passage.

2. In an aeroplane, a fuselage, a motor frame at the forward end thereof, a blower carried by said motor at the rear end thereof, a wing mounted transversely of said fuselage and having a flat bottom surface and a convex upper surface, an air passage formed along the forward edge of said wing transversely of the direction of travel and nozzles extending rearwardly from said passage at both surfaces, and air intake passages formed in said frame and connected to the first named passage.

3. In an aeroplane, a fuselage, a motor frame at the forward end thereof, a blower carried by said motor, a wing mounted transversely of said fuselage and having a flat bottom surface and a convex upper surface, an air passage formed along the forward edge of said wing transversely of the direction of travel and nozzles extending rearwardly from said passage at both surfaces, air intake passages formed in said frame and connected to the first named passage, a tail wing at the rear end of said fuselage and having also a passage in its forward end and nozzles extending rearwardly therefrom, and an air conduit connecting said air intake passage to the last named passage.

4. In an aeroplane, a fuselage, a motor frame at the forward end thereof, a blower carried by said motor at the rear end thereof, a wing mounted transversely of said fuselage and having a flat bottom surface and a convex upper surface, an air passage formed along the forward edge of said wing transversely of the direction of travel and nozzles extending rearwardly from said passage at both surfaces, air intake passages formed in said frame and connected to the first named passage, a tail wing at the rear end of said fuselage and having also a passage in its forward end and nozzles extending rearwardly therefrom, and an air conduit connecting said air intake passage to the last named passage.

In testimony whereof I affix my signature.

BERNHARD G. JÜTTING.